(12) United States Patent
Shi et al.

(10) Patent No.: US 12,494,123 B2
(45) Date of Patent: Dec. 9, 2025

(54) BUS PARKING ALLOCATION METHOD AND APPARATUS CONSIDERING OPERATIONAL PREFERENCES

(71) Applicant: HANGZHOU DIANZI UNIVERSITY, Hangzhou (CN)

(72) Inventors: Xiaoying Shi, Hangzhou (CN); Liming Tu, Hangzhou (CN); Lie Zhang, Hangzhou (CN); Xuqi Luo, Hangzhou (CN); Jundong Wang, Hangzhou (CN)

(73) Assignee: Hangzhou Dianzi University, Hangzhou (CN)

( * ) Notice: Subject to any disclaimer, the term of this patent is extended or adjusted under 35 U.S.C. 154(b) by 166 days.

(21) Appl. No.: 18/601,907

(22) Filed: Mar. 11, 2024

(65) Prior Publication Data
US 2024/0404408 A1      Dec. 5, 2024

(30) Foreign Application Priority Data

Jun. 1, 2023   (CN) .......................... 202310638514.9

(51) Int. Cl.
*G08G 1/14*      (2006.01)

(52) U.S. Cl.
CPC .................................. *G08G 1/148* (2013.01)

(58) Field of Classification Search
CPC ........... G08G 1/148; G08G 1/14; G06Q 50/26
See application file for complete search history.

(56) References Cited

U.S. PATENT DOCUMENTS

| | | | | |
|---|---|---|---|---|
| 5,748,107 A | * | 5/1998 | Kersken | H04H 20/86 341/23 |
| 2013/0046456 A1 | * | 2/2013 | Scofield | G08G 1/096838 701/117 |
| 2019/0019407 A1 | * | 1/2019 | Nakhjavani | G06Q 10/02 |
| 2023/0222607 A1 | * | 7/2023 | Yamada | G08G 1/142 705/13 |
| 2025/0145190 A1 | * | 5/2025 | Mallampati | G06Q 10/08 |

* cited by examiner

*Primary Examiner* — Daryl C Pope
(74) *Attorney, Agent, or Firm* — Mughal Gaudry & Franklin PC (57) ABSTRACT

Disclosed are a bus parking allocation method and apparatus considering operational preferences. The method includes: obtaining a bus station dataset, a parking lot dataset, a bus information dataset, and a bus departure/return dataset; obtaining a distance dataset containing distances between bus stations and parking lots; building a parking allocation model considering operational preferences; building an objective function of the parking allocation model, where one group of buses are allocated to one group of parking lots, with each bus being allocated to at most one parking lot, and the number of buses parked in each parking lot is less than or equal to a capacity of the parking lot; building bus preference lists and parking lot preference lists, and calculating the objective function while satisfying the preference lists, to minimize total parking costs of all buses, thereby obtaining parking allocation results considering operational preferences; and designing multiple visualization views for display.

16 Claims, 8 Drawing Sheets

BUS PARKING ALLOCATION METHOD AND APPARATUS CONSIDERING OPERATIONAL PREFERENCES

CROSS REFERENCE TO RELATED APPLICATION

This patent application claims the benefit and priority of Chinese Patent Application No. 202310638514.9, filed with the China National Intellectual Property Administration on Jun. 1, 2023, the disclosure of which is incorporated by reference herein in its entirety as part of the present application.

TECHNICAL FIELD

The present disclosure relates to the technical field of public transport information, and in particular, to a bus parking allocation method and apparatus considering operational preferences.

BACKGROUND

In recent years, the transportation sector has continuously advanced the construction of green transportation infrastructure. The urban public transit system is a crucial component of the transportation system, playing a vital role in ensuring daily commute of residents and alleviating traffic congestion. Optimizing the operation and management of public transit systems is vital for promoting the development of green transportation. Buses operate daily routes between origin and terminal stations to provide transportation services for urban residents, and park in specific parking lots after operations. The process of a bus leaving the parking lot for the departure station is called departure, and the process of returning to the parking lot from the terminal station is called return. The non-operational mileage driven between the parking lot and the origin and terminal stations is also known as deadhead mileage. Improper allocation of parking lots leads to excessive deadhead mileage, which not only increases operational costs, but also wastes energy.

Assigning buses to designated parking lots poses a parking allocation problem, aiming to allocate buses to appropriate parking lots with minimum costs. For a large city, given the extensive urban area, there are multiple operational branches under the public transit group, and each branch is responsible for bus scheduling and parking management within a specific region. The operational branches typically prefer to park their buses in their designated parking lots for ease of management. How to implement scientific and rational parking allocation considering management requirements of operational branches for buses, routes, and parking lots, in order to reduce operational costs and save energy, is a significant challenge for urban public transportation enterprises and administrations.

The traditional method involves manually designating parking lots for buses, and the rational allocation relies mainly on human experience, making it unable to achieve the optimal solution. Some research has been conducted to reduce the cruising mileage of private cars when searching for parking lots. Parking recommendations for private cars mainly consider factors such as parking duration, price, and user privacy. However, these parking allocation methods cannot be directly applied to bus parking allocation. Unlike private cars, buses have parking spaces at fixed locations, and parking prices and privacy are not the primary considerations. However, it is necessary to meet the management requirements of operational branches as much as possible during parking allocation. Existing methods mainly minimize parking costs by assigning buses to available parking spaces closest to their destinations, but the globally optimal solution calculated ignores the actual management needs in the bus operation process. Currently, there is a lack of rational and effective bus parking allocation methods that minimize the operational costs associated with bus parking while taking into account the management requirements of the operational branches.

SUMMARY

To address the shortcomings of the prior art and achieve the objective of minimizing total parking costs while meeting operational requirements, the present disclosure adopts the following technical solution:

A bus parking allocation method considering operational preferences is provided, including the following steps:

step 1: obtaining a bus station dataset, a parking lot dataset, a bus information dataset, and a bus departure/return dataset;

step 2: obtaining a distance dataset containing distances between bus stations and parking lots;

step 3: building a parking allocation model considering operational preferences, where one group of buses is allocated to one group of parking lots, with each bus being allocated to at most one parking lot, the number of buses parked in each parking lot is less than or equal to a capacity of the parking lot, and an objective function of the parking allocation model is as follows:

$$\min \sum_{i \in B} \sum_{j \in P} c_i d_{ij} x_{ij}$$

$$x_{ij} = \begin{cases} 1, & \text{park } i^{th} \text{ bus at } j^{th} \text{ parking space} \\ 0, & \text{not park } i^{th} \text{ bus at } j^{th} \text{ parking space} \end{cases}$$

where $c_i$ represents costs per unit travel distance of an i-th bus, and $d_{ij}$ represents a travel distance between a parking lot and a bus station; and step 4: building bus preference lists and parking lot preference lists, and calculating the objective function while satisfying the bus preference lists and the parking lot preference lists, to minimize total parking costs of all buses, thereby obtaining parking allocation results considering operational preferences.

Further, step 1 includes the following steps:

step 1.1: obtaining the bus station dataset, the parking lot dataset, the bus information dataset, and the bus departure/return dataset;

where the bus station dataset includes relevant information of all bus stations, with each bus station data record represented as $R_{stop}=(sID,sName,sCoord)$, where sID represents a bus station ID, sName represents a bus station name, and sCoord represents bus station coordinates;

the parking lot dataset includes relevant information of all bus parking lots, with each parking lot data record represented as $R_{park}=(pID,pName,pCoord,capacity)$, where pID represents a parking lot ID, pName represents a parking lot name, pCoord represents parking lot coordinates, and capacity represents a parking lot capacity;

the bus information dataset includes relevant information of all buses, with each bus data record represented as $R_{bus}$=(busID,type,len,unitCost) where busID represents a bus ID, type represents a bus type, len represents a bus length, and unitCost represents costs per kilometer for said bus type and bus length; and the bus departure/return dataset includes relevant information about buses traveling from the parking lots to departure stations and returning from terminal stations to the parking lots, with each bus departure/return data record represented as follows:

$R_{BP}$=(busID,state,startSType,startSID,startTime,endSType,endSID,endTime)

where busID represents a bus ID, state represents a parking status, that is, departure or return, startTime represents a departure time, and endTime represents an arrival time; when state is departure, startSType indicates that a departure location is a parking lot, with startSID representing a parking lot ID and relevant information being available in the parking lot dataset, and endSType indicates that an arrival location is a bus departure station, with endSID representing a bus station ID and relevant information being available in the bus station dataset; when state is return, startSType indicates that a departure location is a terminal bus station, with startSID representing a bus station ID, and endSType indicates that an arrival location is a parking lot, with endSID representing a parking lot ID; and step 1.2: preprocessing data;

where the bus departure/return dataset is preprocessed: first removing invalid empty data, including data where busID is empty, startTime is empty, or endTime is empty; next, sorting the buses by time to identify a first departure record and a last return record for each bus; and finally, based on a departure parking lot ID of each bus, that is, startSID, calculating a current parking volume of each parking lot.

Furthermore, in step 2, for all the bus stations {$R_{stop}$} and all the parking lots ($R_{park}$), based on the bus station coordinates sCoord and the parking lot coordinates pCoord, travel distances between the bus stations and the parking lots are obtained using a map application programming interface (API) and stored in the distance dataset, with each distance data record represented as $R_{dist}$=(sID,pID,dist1,dist2) where dist1 represents a travel distance from bus station sID to parking lot pID, and dist2 represents a travel distance from parking lot pID to bus station sID.

Furthermore, the parking allocation model considering operational preferences is built, denoted as (B,P,$\succ_B$,$\succ_P$,$q_p$), where one group of buses B are allocated to one group of parking lots P, and each bus is allocated to at most one parking lot. Shared interests and conflicting interests are modeled using the concept of preferences, where $\succ_B$=($\succ_i$)$_{i \in B}$ represents bus preference relationships, and j$\succ_i$j' indicates that bus i prefers parking at parking lot j compared to parking lot j'. $\succ_P$=($\succ_j$)$_{j \in P}$ represents parking lot preference relationships, and i$\succ_j$i' indicates that parking lot j is more willing to accept bus i compared to bus i'. $q_P$ represents a parking space capacity of the parking lot, which is defined based on capacity or a current parking volume. The parking allocation model is defined as follows:

decision variables:

$$x_{ij} = \begin{cases} 1, & \text{park } i^{th} \text{ bus at } j^{th} \text{ parking space} \\ 0, & \text{not park } i^{th} \text{ bus at } j^{th} \text{ parking space} \end{cases}$$

objective function:

$$\min \sum_{i \in B} \sum_{j \in P} c_i d_{ij} x_{ij}$$

constraints:

$$\begin{cases} \sum_{j \in P} x_{ij} = 1, & \forall i \in B \text{ each bus is parked in only one parking lot} \\ \sum_{i \in B} x_{ij} \leq q, & \forall j \in P \text{ the number of buses parked in each} \\ & \text{parking lot is less than or equal to its capacity} \\ x_{ij} = 1 \text{ or } 0 \end{cases}$$

where in the objective function, $c_i$ represents costs for an i-th bus to travel per kilometer, which is obtained based on unitcost; $d_{ij}$ represents a travel distance between the parking lot and the bus station, i.e., a sum of a travel distance from the parking lot to a departure station and a travel distance from a terminal station to the parking lot, which is retrievable from the distance dataset; and an optimization goal is to satisfy preferences of the buses and the parking lots while minimizing the total parking costs of all the buses.

Further, step 4 includes the following steps:

step 4.1: building the bus preference lists;

where a preference relationship of each bus regarding different parking lots, denoted as $\succ_B$, is defined based on a cost minimization criterion, and the bus preference list is calculated accordingly; for each bus, travel distances between the parking lots and the bus stations are calculated based on the distance dataset, then corresponding travel costs are calculated, and finally, based on the cost minimization criterion, a preference list of the bus regarding all the parking lots is built;

step 4.2: building the parking lot preference lists;

where a preference relationship of each parking lot regarding different buses, denoted as $\succ_P$, is defined considering bus management requirements of operational branches, and the parking lot preference list is calculated accordingly; managers define different parking lot preferences as needed; and step 4.3: obtaining preference-based parking allocation results using a Gale-Shapley algorithm;

where based on the bus preference lists and the parking lot preference lists, parking allocation is performed for the buses by using the Gale-Shapley algorithm; in each iteration, each unmatched bus applies, based on the bus preference list thereof, to park at a highest-ranked parking lot that the unmatched bus has not applied for before; then, the parking lot determines, based on preferences and capacity thereof, whether to accept the current application/replace an already accepted bus, or reject current matching; if a current number of matches for the parking lot does not exceed the capacity, matching continues; if the current number of matches exceeds the capacity, a lowest-priority match is removed from all matches for the parking lot; if all the buses find corresponding parking lots, the matching is successful, and the objective function is evaluated and solved; otherwise, a next iteration is performed; after the iterations end, optimal matches between the buses and the parking lots are found, minimizing the total parking costs while satisfying the bus preference relationships and the parking lot preference relationships.

Furthermore, in step 4.2, to ensure that the buses are most likely parked in parking lots managed by respective operational branches to which the buses belong, for each parking lot, IDs of buses under the jurisdiction of the parking lot are first obtained, and high priority is assigned to these buses; then, travel distances between the parking lot and bus stations are obtained, and corresponding travel costs are calculated; a secondary sorting is performed based on the cost minimization criterion, and a preference list of the parking lot regarding all the buses is built.

Furthermore, in step 4.2, to minimize bus changes, for each parking lot, high priority is assigned to buses originally parked in the parking lot and lowest priority is assigned to buses originally not parked in the parking lot; then, a secondary sorting is performed based on the cost minimization criterion, and the parking lot preference list is built.

Moreover, the method further includes step 5: designing multiple visualization views, including a city parking allocation map, a parking lot traffic flow chart, a parking lot bus ratio chart, a distance distribution difference chart, and a city parking allocation difference map, to present and compare the parking allocation results.

The city parking allocation map is used to display parking allocation results of an entire city. For each parking lot, the number of buses (traffic flow value) departing from the parking lot to different bus departure stations and returning from different bus terminal stations to the parking lot is counted first, and then visualized on the map; bus stations, parking lots, as well as incoming and outgoing traffic flows of the parking lots are identified.

The parking lot traffic flow chart is used to illustrate a parking traffic flow of buses associated with a specific parking lot. By selecting a parking lot of interest, a relevant traffic flow of buses parked in the selected parking lot is shown.

The parking lot bus ratio chart is used to illustrate operational branches to which buses parked in each parking lot belong. Based on bus IDs in each parking lot, proportions of buses from different operational branches in each parking lot are calculated and then visualized on the map.

The distance distribution difference chart is used to compare differences in empty mileage optimization between an original parking allocation scheme and a parking allocation scheme considering preferences.

The city parking allocation difference map is used to present geographical distribution differences in traffic between the original parking allocation scheme and the parking allocation scheme considering preferences; bus stations, parking lots, the parking traffic flows of the original parking allocation scheme, the parking traffic flows considering preferences, and traffic flow sizes are identified. By obtaining a distance value, parking allocation differences above the obtained distance value are displayed.

A bus parking allocation apparatus considering operational preferences is also provided, including a memory and one or more processors. The memory stores executable code, and when executing the executable code, the one or more processors implement the bus parking allocation method considering operational preferences.

The present disclosure has the following beneficial effects.

In the bus parking allocation method and apparatus considering operational preferences of the present disclosure, the parking allocation problem is modeled as a many-to-one matching game, and preferences during bidirectional selection of buses and parking lots are defined based on travel distances between the parking lots and bus stations, travel costs for different types of buses, and operational requirements of the parking lots. Considering the preference relationships, optimal matches between the buses and the parking lots are computed using the Gale-Shapley algorithm, thus minimizing total parking costs while considering operational requirements of the operational branches. Visualization views are designed from multiple perspectives, allowing managers to intuitively understand the characteristics of the parking allocation schemes, assisting the managers in decision-making and enhancing the intelligent operation level of large urban bus systems.

DETAILED DESCRIPTION OF THE EMBODIMENTS

The specific implementations of the present disclosure are described in detail below with reference to the accompanying drawings. It should be understood that the specific implementations described herein are merely intended to illustrate and interpret the present disclosure, rather than to limit the present disclosure.

Figure 1:
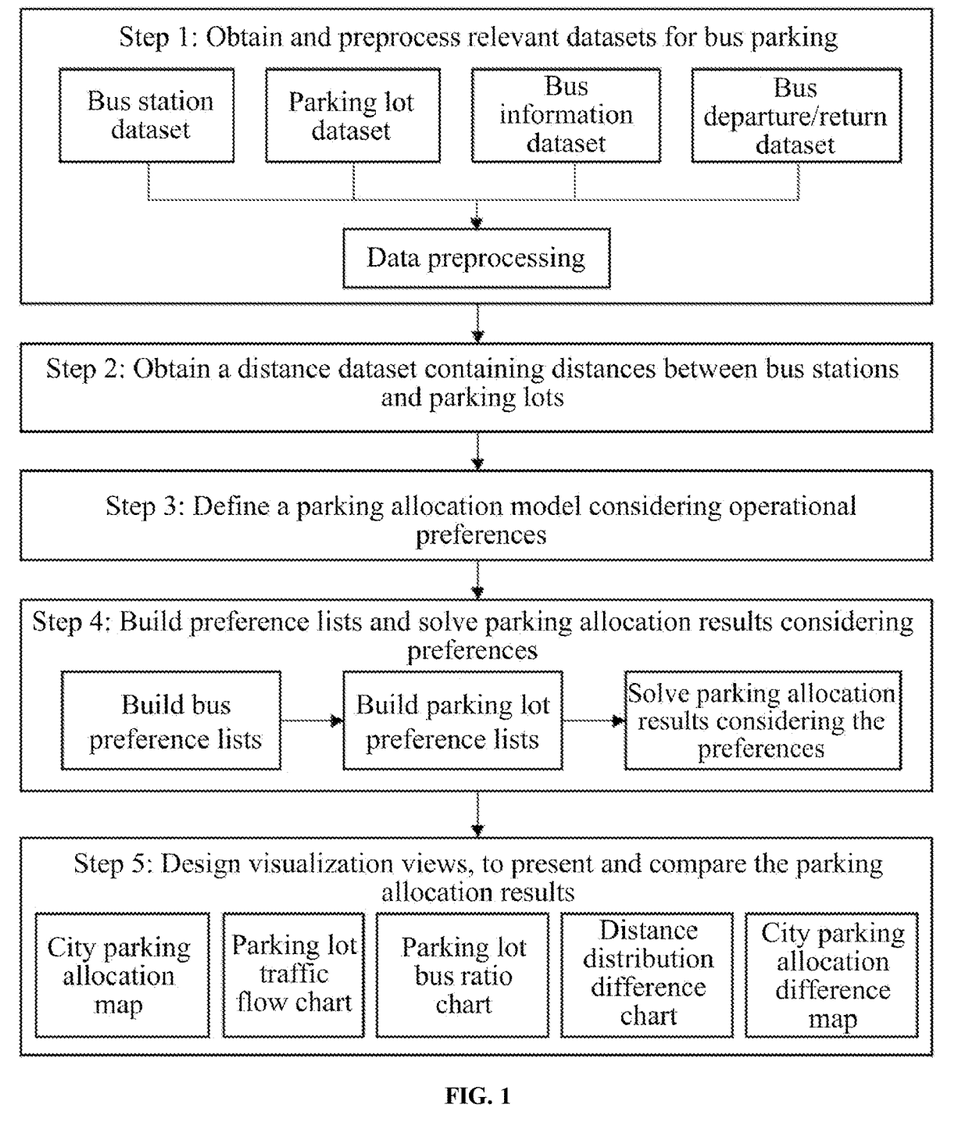
FIG. 1 is a flowchart of a method according to an embodiment of the present disclosure.

As shown in FIG. 1, a bus parking allocation method considering operational preferences is provided. First, based on distances from bus departure stations and terminal stations to parking lots, travel costs of different types of buses, and management requirements of operational branches, a bus preference matrix and a parking lot preference matrix are defined separately. Then, based on a matching theory, a parking allocation method is designed to automatically allocate parking lots for buses, minimizing total parking costs while satisfying the operational requirements of the operational branches as much as possible. Finally, multiple visualization views are designed to intuitively present bus arrangement of the parking allocation plan, assisting managers in making decisions. The method specifically includes the following steps:

Step 1: Obtain a bus station dataset, a parking lot dataset, a bus information dataset, and a bus departure/return dataset, and preprocess data.

Step 1.1: Obtain the bus station dataset, the parking lot dataset, the bus information dataset, and the bus departure/return dataset, and store these datasets in a database.

The bus station dataset contains relevant information of all bus stations. A bus station data record is represented as follows: $R_{stop}$=(sID,sName,sCoord). sID represents a bus station ID, sName represents a bus station name, and sCoord represents bus station coordinates.

The parking lot dataset contains information of all bus parking lots. A parking lot data record is represented as follows: $R_{park}$=(pID,pName,pCoord,capacity). pID represents a parking lot ID, pName represents a parking lot name, pCoord represents parking lot coordinates, and capacity represents a parking lot capacity.

The bus information dataset contains relevant information of all buses. A bus information data record is represented as follows: $R_{bus}$=(busID,type,len,unitCost) busID represents a bus ID, such as "3-9844," where the number before "–" indicates an operational branch number, and the number after "–" indicates a bus number. type represents a bus type, such as "pure electric." len represents a bus length, and unitCost represents travel costs per kilometer of said bus type and bus length.

The bus departure/return dataset includes relevant information about buses traveling from the parking lots to departure stations and returning from terminal stations to the parking lots. A bus departure/return data record is represented as follows:

$R_{BP}$=(busID,state,startSType,startSID,startTime,end-SType,endSID,endTime)

busID represents a bus ID, state represents a parking status, i.e., departure or return. startTime and endTime represent a departure time and an arrival time, respectively. When is state departure, startSType is set to 2, indicating that a departure location is a parking lot, with startSID representing a parking lot ID and relevant information being available in the parking lot dataset, and endSType is set to 1, indicating that an arrival location is a bus departure station, with endSID representing a bus station ID and relevant information being available in the bus station dataset; when state is return, startSType is set to 1, indicating that a departure location is a terminal bus station, with startSID representing a bus station ID, and endSType is set to 2, indicating that an arrival location is a parking lot, with endSID representing a parking lot ID.

Step 1.2: Preprocess the data.

The bus departure/return dataset is preprocessed. First, invalid empty data is removed, including data where busID is empty, startTime is empty, or endTime is empty. Next, the buses are sorted by time to identify a first departure record and a last return record for each bus. Finally, based on an departure parking lot ID of each bus, that is, startSID, a current parking volume of each parking lot is calculated.

Step 2: Obtain a distance dataset containing distances between bus stations and parking lots.

For all the bus stations {$R_{stop}$} and all the parking lots ($R_{park}$), based on the bus station coordinates sCoord and the parking lot coordinates pCoord, travel distances between the bus stations and the parking lots are obtained using a map application programming interface (API), and stored in the distance dataset. A distance data record is represented as follows: $R_{dist}$=(sID,pID,dist1, dist2). dist1 represents a travel distance from bus station sID to parking lot pID, and dist2 represents a travel distance from parking lot pID to bus station sID.

Step 3: Build a parking allocation model considering operational preferences.

Based on the matching theory, buses and parking lots are considered as two sets of players. By regarding the parking allocation problem considering operational preferences as a many-to-one matching game, a parking allocation model considering operational preferences is built, denoted as (B,P, $\succ_B, \succ_P, q_P$). One group of buses B are allocated to one group of parking lots P, and each bus is allocated to at most one parking lot. Shared interests and conflicting interests are modeled using a concept of preferences. $\succ_B = (\succ_i)_{i \in B}$ represents bus preference relationships, and j$\succ_i$j' indicates that bus prefers parking at parking lot j compared to parking lot j'. $\succ_P = (\succ_j)_{j \in P}$ represents parking lot preference relationships, and i$\succ_j$i' indicates that parking lot j is more willing to accept bus i compared to bus i'. $q_P$ represents a parking space capacity of the parking lot, which is defined based on capacity or a current parking volume. The parking allocation model is defined as follows:

decision variables:

$$x_{ij} = \begin{cases} 1, & \text{park } i^{th} \text{ bus at } j^{th} \text{ parking space} \\ 0, & \text{not park } i^{th} \text{ bus at } j^{th} \text{ parking space} \end{cases} \quad (1)$$

objective function:

$$\min \sum_{i \in B} \sum_{j \in P} c_i d_{ij} x_{ij} \quad (2)$$

constraints:

$$\begin{cases} \sum_{j \in P} x_{ij} = 1, & \forall i \in B \text{ each bus is parked in only one parking lot} \\ \sum_{i \in B} x_{ij} \leq q, & \forall j \in P \text{ the number of buses parked in each parking lot is less than or equal to its capacity} \\ x_{ij} = 1 \text{ or } 0 \end{cases} \quad (3)$$

In the objective function, $c_i$ represents costs for an i-th bus to travel per kilometer, which is obtained based on unitcost; $d_{ij}$ represents a travel distance between the parking lot and the bus station, i.e., a sum of a travel distance from the parking lot to a departure station and a travel distance from a terminal station to the parking lot, which is retrievable from the distance dataset. An optimization goal is to satisfy preferences of the buses and the parking lots while minimizing the total parking costs of all the buses.

Step 4: Build bus preference lists and parking lot preference lists, and obtain preference-based parking allocation results using a Gale-Shapley algorithm.

Step 4.1: Build the bus preference lists.

A preference relationship $\succ_B$ of each bus regarding different parking lots is defined based on a cost minimization criterion, and the bus preference list is calculated accordingly. For each bus, travel distances between the parking lots and the bus stations are first obtained from the distance dataset, and then corresponding travel costs are calculated. Finally, based on the cost minimization criterion, a preference list of the current bus regarding all the parking lots is built.

Step 4.2: Build the parking lot preference lists.

A preference relationship of each parking lot regarding different buses, denoted as $\succ_P$, is defined considering bus management requirements of operational branches, and the parking lot preference list is calculated accordingly. Managers can define different parking lot preferences as needed. If the managers want to maximize parking in parking lots managed by respective operational branches to which the buses belong, for each parking lot, first, IDs of buses under the jurisdiction of the parking lot are obtained, and high priority is assigned to these buses. Then, travel distances between the parking lot and bus stations are obtained, and corresponding travel costs are calculated; a secondary sorting is performed based on the cost minimization criterion, and a preference list of the parking lot regarding all the buses is built. If managers want to minimize bus changes, for each parking lot, high priority is assigned to buses originally parked in the parking lot and lowest priority is assigned to buses originally not parked in the parking lot; then, a secondary sorting is performed based on the cost minimization criterion, and the parking lot preference list is built.

Step 4.3: Obtain preference-based parking allocation results using a Gale-Shapley algorithm.

Based on the bus preference lists and the parking lot preference lists, parking allocation is performed for the buses by using the Gale-Shapley algorithm. In each iteration, each unmatched bus applies, based on the bus preference list thereof, to park at a highest-ranked parking lot that the unmatched bus has not applied for before. Then, the parking lot determines, based on preferences and capacity thereof, whether to accept the current application/replace an already accepted bus, or reject current matching. If a current number of matches for the parking lot does not exceed the capacity, matching continues; if the current number of matches exceeds the capacity, a lowest-priority match is removed from all matches for the parking lot. If all the buses find corresponding parking lots, the matching is successful, and the objective function is evaluated and solved; otherwise, a next iteration is performed. After iterations end, optimal matches between the buses and the parking lots are found, minimizing the total parking costs while satisfying the bus preference relationships and the parking lot preference relationships.

Step 5: Design multiple visualization views, including a city parking allocation map, a parking lot traffic flow chart, a parking lot bus ratio chart, a distance distribution difference chart, and a city parking allocation difference map, to present and compare the parking allocation results.

Figure 2:
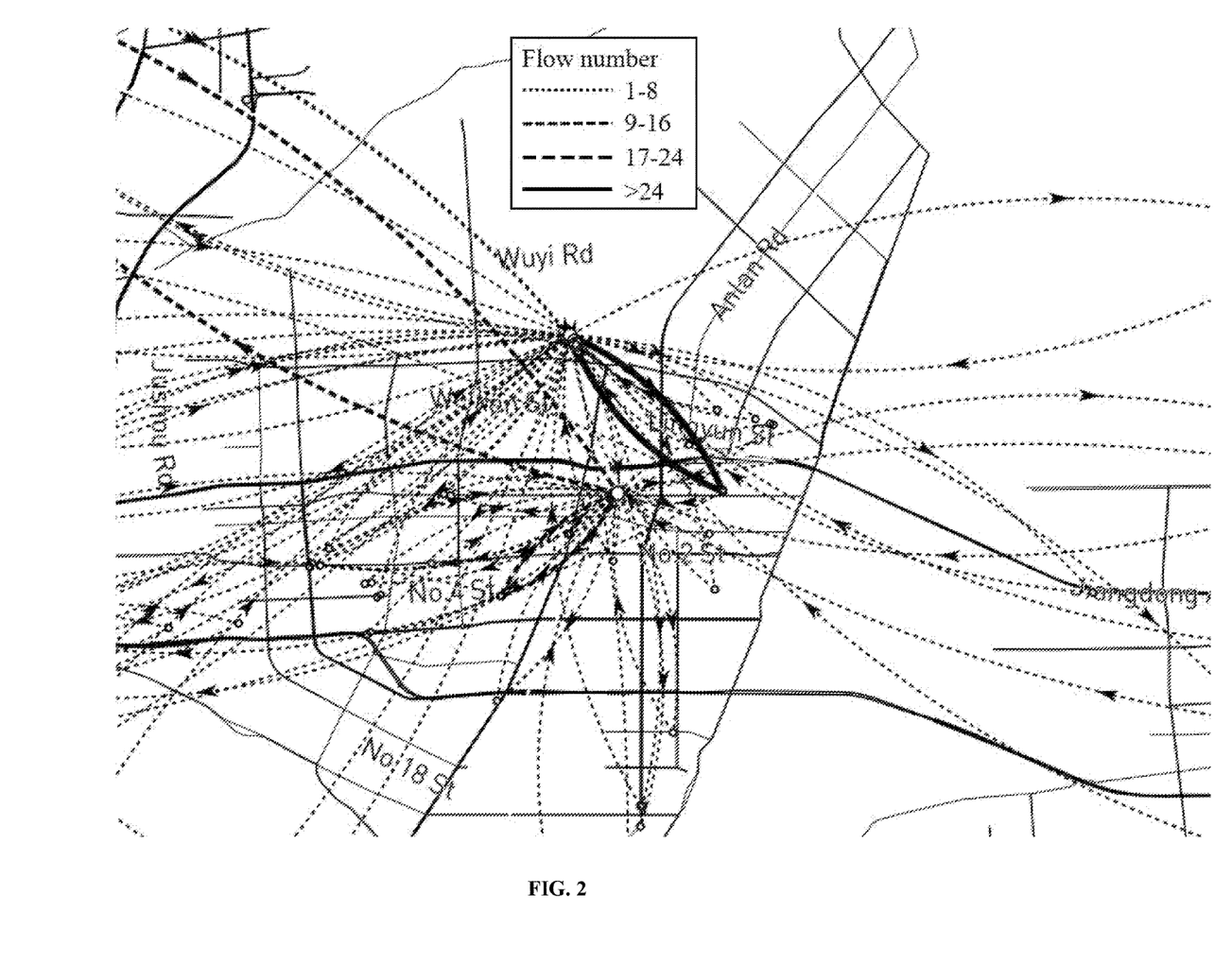
FIG. 2 is a city parking allocation map of the method considering preferences according to an embodiment of the present disclosure.

Step 5.1: Design the city parking allocation map.

The city parking allocation map displays the parking allocation results across the entire city. For each parking lot, the number of buses (traffic flow value) departing from the parking lot to different bus departure stations and returning from different bus terminal stations to the parking lot is counted first, and then visualized on the map. The small black circle represents bus stations, the large black circle represents parking lots, and the curve with an arrow represents the outgoing and incoming traffic flows of the parking lot. Traffic values are represented by different dashed or solid lines, with thick solid lines indicating larger traffic and thin dashed lines indicating smaller traffic. In this embodiment of the present disclosure, as shown in FIG. 2, the city parking allocation map in the method considering preferences is displayed. Preferences are defined to maximize parking in the parking lots managed by the respective operational branches to which the buses belong. The map provides an intuitive view of geographical relationships between parking lots and corresponding departure/terminal stations, and the quantities of buses on different routes.

Figure 3:
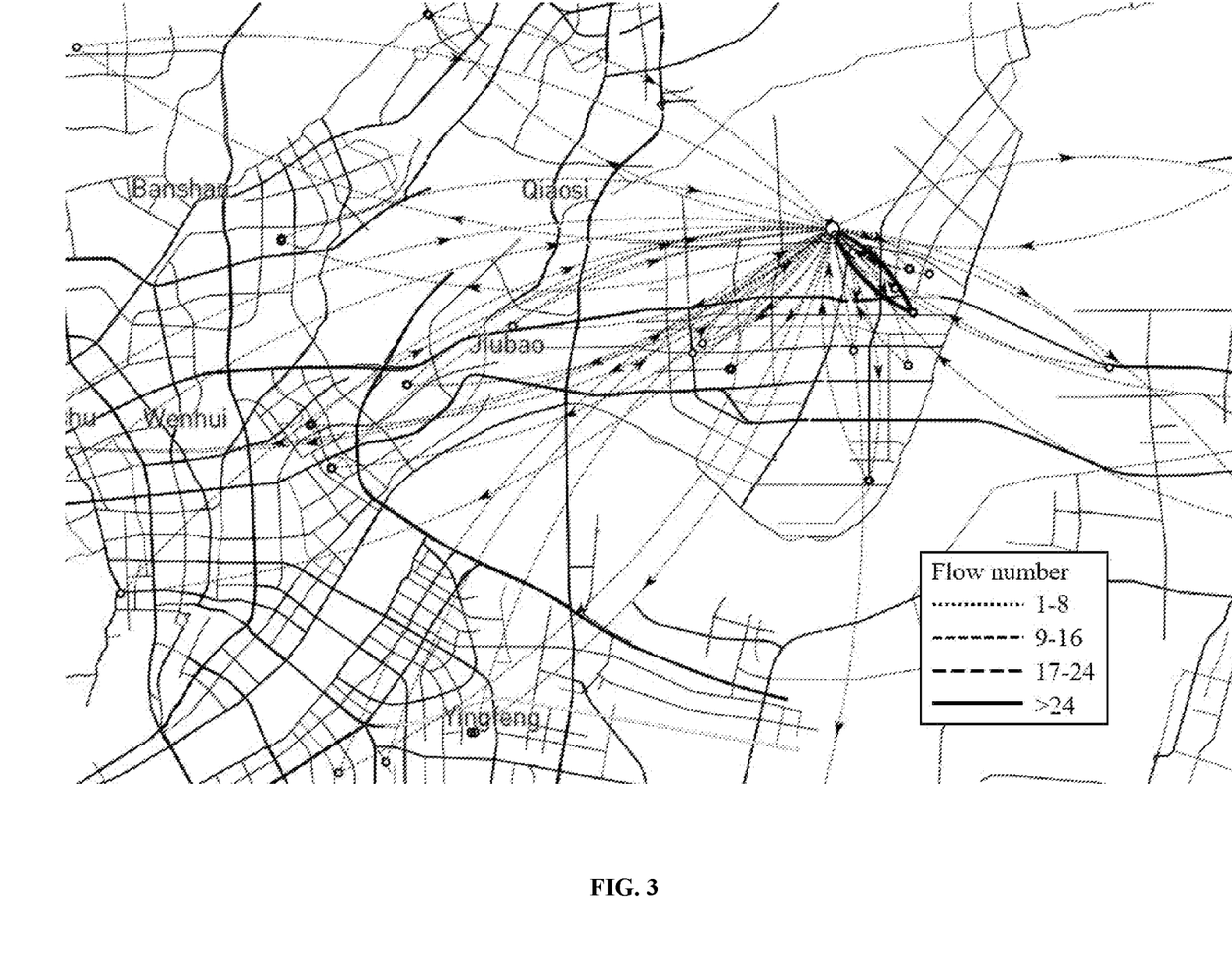
FIG. 3 is a city parking lot traffic flow chart of the method considering preferences according to an embodiment of the present disclosure.

Step 5.2: Design the parking lot traffic flow chart.

The parking lot traffic flow chart shows the parking traffic flow of buses related to a specific parking lot. Users can select a parking lot of interest, and the map displays only the relevant traffic flow of buses parked in the selected parking lot. The central large dot represents the selected parking lot, while smaller dots represent locations of departure/terminal stations of buses associated with the parking lot. The curve with an arrow represents the outgoing and incoming traffic flows of the parking lot. In this embodiment of the present disclosure, FIG. 3 shows a parking lot traffic flow chart of the method considering preferences for the Xiasha bus parking lot. The map vividly presents the outgoing/incoming traffic flows of the buses associated with the current parking lot.

Figure 4A:
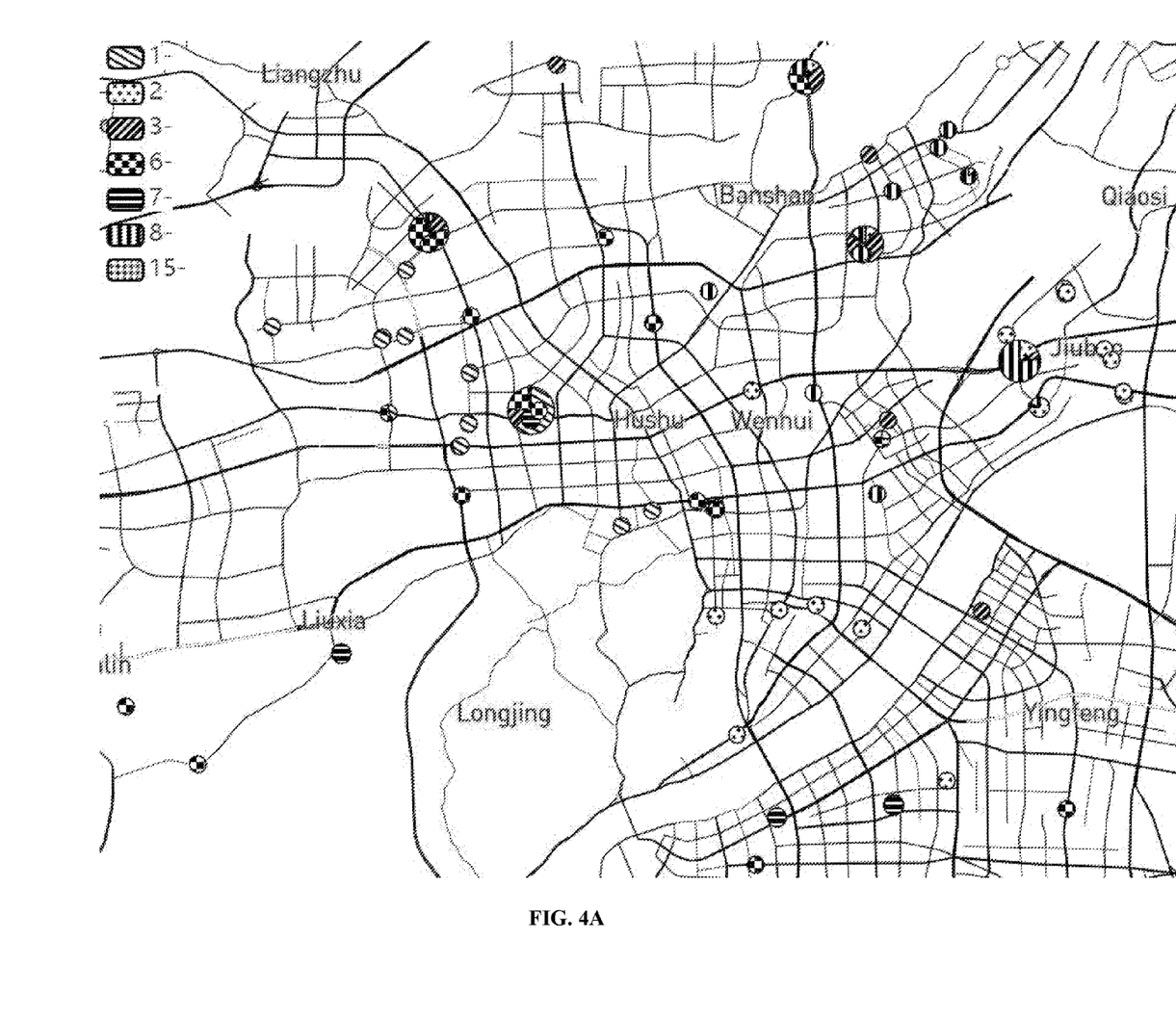
FIG. 4A is a parking lot bus ratio chart under an original bus parking allocation method.
Figure 4B:
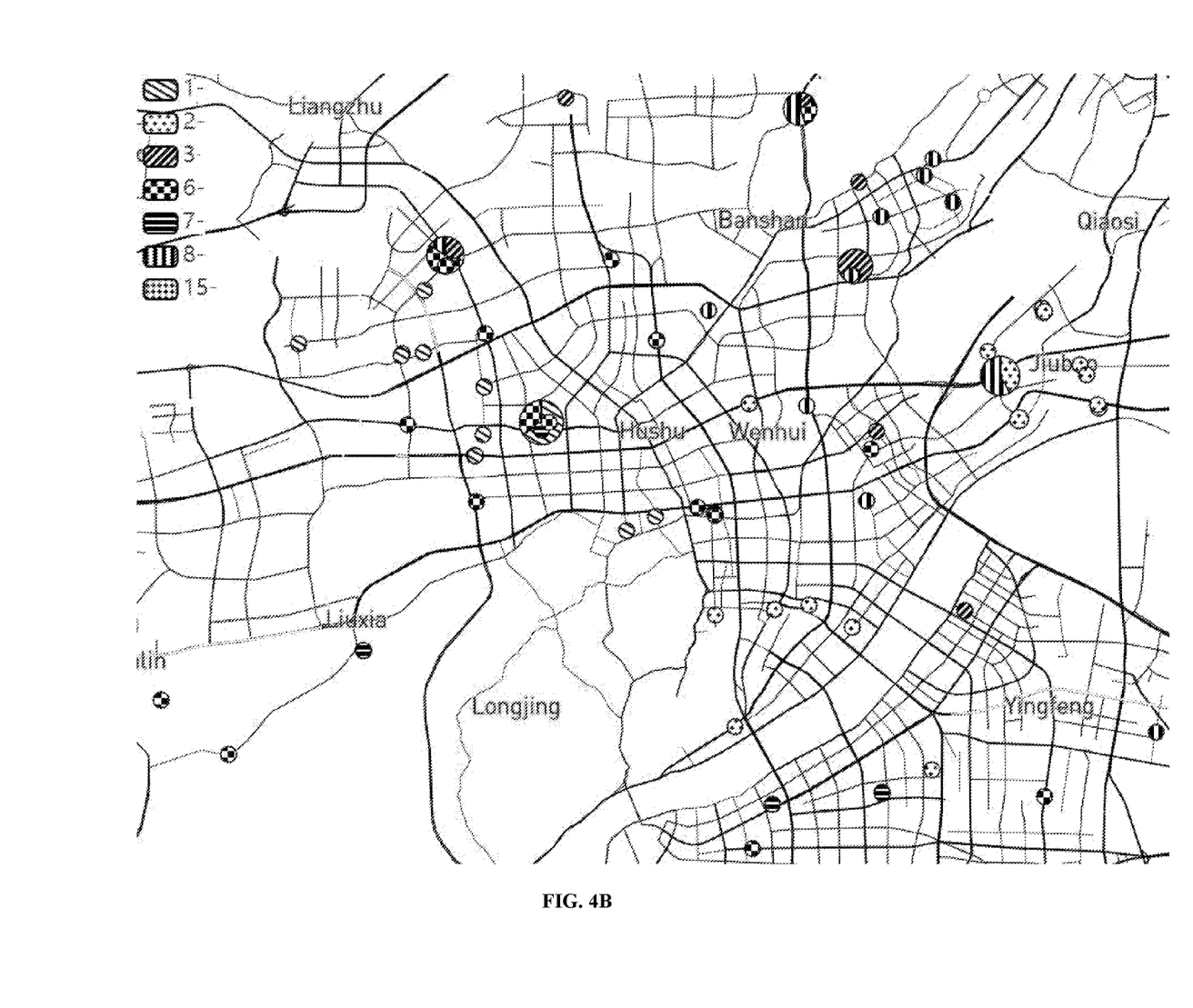
FIG. 4B is a parking lot bus ratio chart under the method considering preferences according to an embodiment of the present disclosure.

Step 5.3: Design the parking lot bus ratio chart.

The parking lot bus ratio chart displays proportion of buses from different operational branches parked at each parking lot. First, proportions of buses from different operational branches in each parking lot are calculated based on the prefix of each bus ID (denoted as busID) in the parking lot and then visualized on the map. Each parking lot is represented by a pie chart where the radius of the pie chart is proportional to the parking lot capacity. The sizes of sectors in the pie chart are proportional to the quantities of buses from different operational branches, and textures of the sectors correspond to the different operational branches. In this embodiment of the present disclosure, FIG. 4A and FIG. 4B show the parking lot bus ratio chart of the original method and the parking lot bus ratio chart of the method considering preferences. The method considering preferences maintains a bus proportion distribution similar to that in the original method. In FIG. 4A and FIG. 4B, the numbers represent different operational branches.

Figure 5:
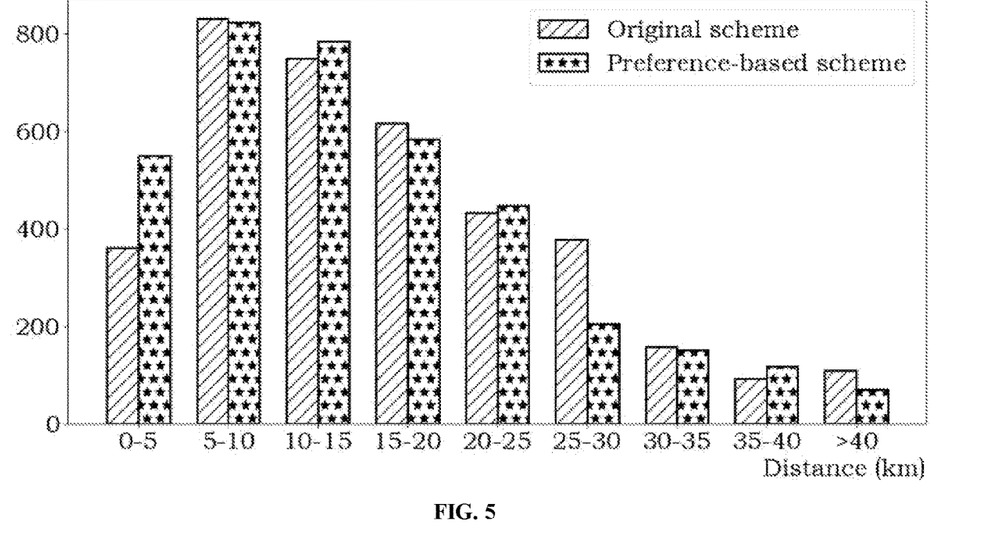
FIG. 5 is a distance distribution difference chart between the original method and the present method according to an embodiment of the present disclosure.

Step 5.4: Design the distance distribution difference chart.

To effectively compare the differences in empty mileage optimization between the original parking allocation method and the parking allocation method considering preferences, the distance distribution difference chart is designed. The horizontal axis represents a range of bus travel distances, while the vertical axis indicates the number of buses falling within the current distance range. In this embodiment of the present disclosure, FIG. 5 shows the distance distribution difference chart. It can be seen from the figure that, compared with the original method, the method considering preferences has a significant reduction in the number of buses in the range of 25 km to 30 km and a considerable increase in the range of 0 km to 5 km. This indicates that the method considering preferences significantly reduces long-distance traffic, allowing buses to park at parking lots closer to their departure/terminal stations.

Figure 6:
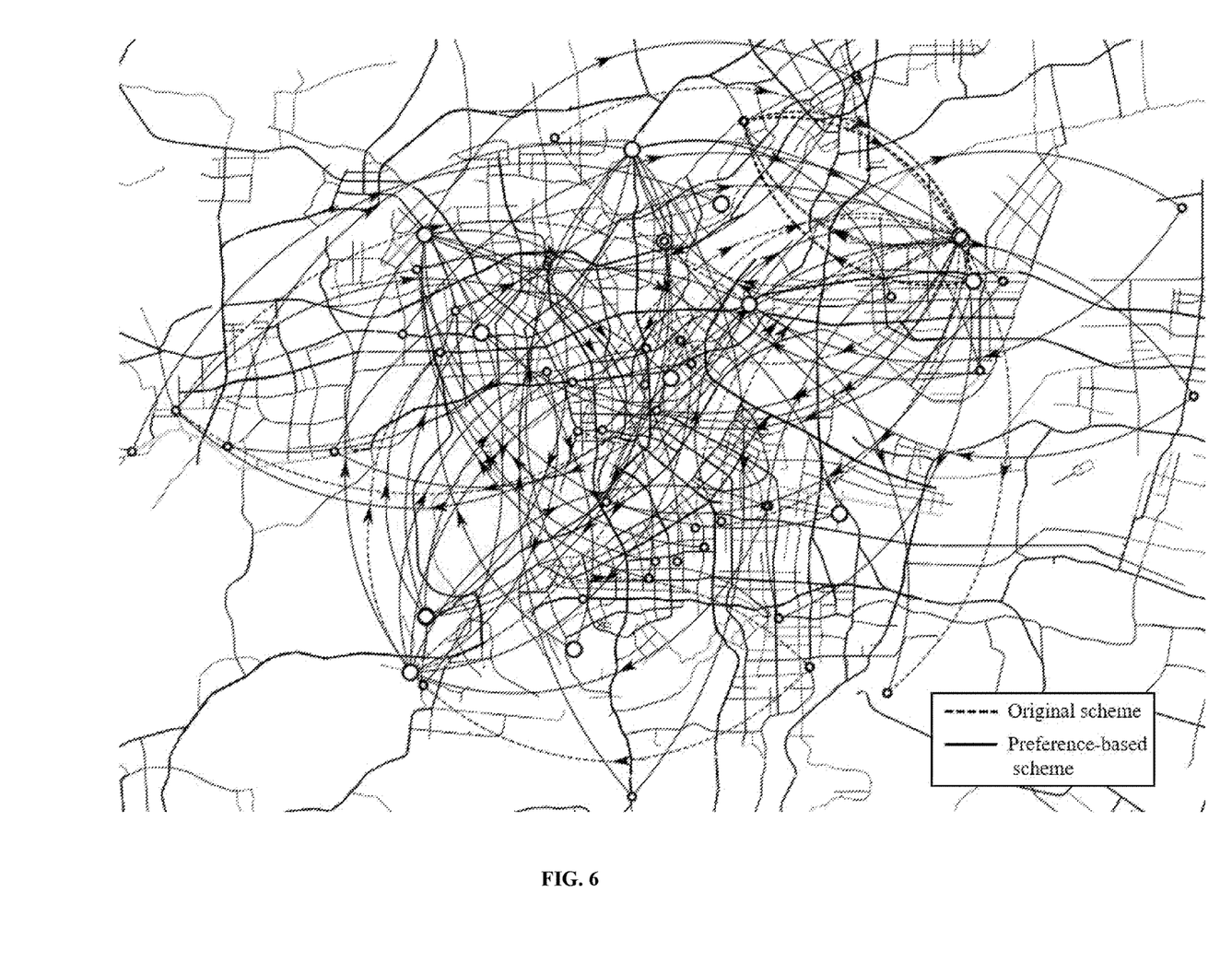
FIG. 6 is a city parking allocation difference map between the original method and the present method according to an embodiment of the present disclosure.

Step 5.5: Design the city parking allocation difference map.

To better illustrate the geographical distribution differences in traffic between the original parking allocation method and the parking allocation method considering preferences, the city parking allocation difference map is designed. Small dots represent bus stations, while larger dots represent parking lots. Solid curved lines indicate parking traffic using the original allocation method, while dotted curved lines represent parking traffic using the method considering preferences. The thickness of the lines encodes the values of the traffic flows. A thicker curved line indicates a higher number of buses on that route. Users can input a distance value, and the map will display parking allocation differences above that distance value. In this embodiment of the present disclosure, FIG. 5 shows the city parking allocation difference map. The user chooses to observe parking allocation differences with distances exceeding 48 km. It can be seen in the figure that in the original method, solid curved lines for long distances are thicker. In the method considering preferences, there are fewer dotted curved lines for long distances.

Corresponding to the foregoing embodiment of the bus parking allocation method considering operational preferences, the present disclosure further provides an embodiment of a bus parking allocation apparatus considering operational preferences.

Figure 7:
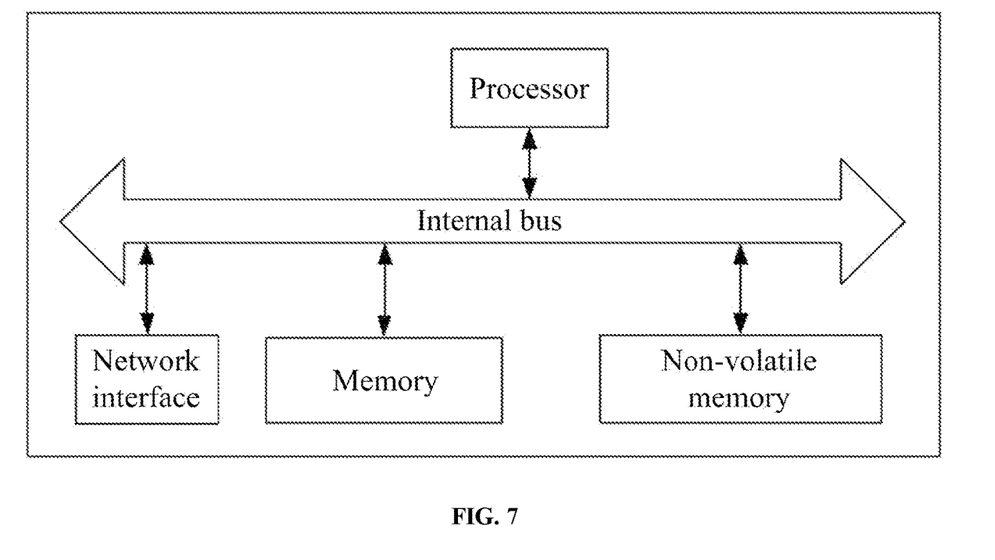
FIG. 7 is a schematic structural diagram of an apparatus according to an embodiment of the present disclosure.

Referring to FIG. 7, the bus parking allocation apparatus considering operational preferences provided by the embodiment of the present disclosure includes a memory and one or more processors. The memory stores executable code, and when executing the executable code, the one or more processors implement the bus parking allocation method considering operational preferences as described in the foregoing embodiment.

The embodiment of the bus parking allocation apparatus considering operational preferences according to the present disclosure can be applied to any device with data processing capabilities, such as a computer or other similar apparatuses or devices. The apparatus embodiment can be implemented through software, hardware, or a combination of software and hardware. Using software implementation as an example, as a logical apparatus, it is formed by reading, by a processor of a device with data processing capabilities where the apparatus is located, corresponding computer program instructions from a non-volatile memory into a memory for running. From a hardware perspective, FIG. 7 is a hardware structure diagram of a device with data processing capabilities where the bus parking allocation apparatus considering operational preferences according to the present disclosure is located. In addition to the processor, memory, network interface, and non-volatile memory shown in FIG. 7, the device with data processing capabilities, in which the apparatus of the embodiment is located, may typically include other hardware based on the actual functionality of the device with data processing capabilities, and details are not described herein.

The specific implementation process of the functions and roles of each unit in the above apparatus is detailed in the corresponding steps of the foregoing method and is not described herein again.

For the apparatus embodiment, since it substantially corresponds to the method embodiment, it is sufficient to refer to a part of the description of the method embodiment where relevant. The device embodiment described above is merely schematic, where the unit described as a separate component may or may not be physically separated, and a component displayed as a unit may or may not be a physical unit, that is, the component may be located at one place, or distributed on multiple network units. Some or all of its modules may be selected according to actual needs to implement the solutions of the present disclosure. Those of ordinary skill in the art can understand and implement the embodiments without creative effort.

An embodiment of the present disclosure further provides a computer-readable storage medium, storing a computer program thereon. When the program is executed by a processor, the bus parking allocation apparatus considering operational preferences in the foregoing embodiment is implemented.

The computer-readable storage medium may be an internal storage unit of the device with data processing capabilities described in any of the foregoing embodiments, such as a hard disk or an internal storage. The computer readable storage medium may alternatively be an external storage device of the device with data processing capabilities, such as a plug-in hard disk, a smart media card (SMC), an SD card, or a flash card equipped on the device. Further, the computer-readable storage medium may alternatively include both an internal storage unit and an external storage device of the device with data processing capabilities. The computer readable storage medium is configured to store the computer program and other programs and data that are required by the device with data processing capabilities, or may further be configured to temporarily store data that has been output or to be output.

The above embodiments are merely intended to describe the technical solutions of the present disclosure, rather than to limit the present disclosure. Although the present disclosure is described in detail with reference to the above embodiments, a person of ordinary skill in the art will understand that modifications can be made to the technical solutions described in the above embodiments or equivalent replacements can be made to some or all technical features thereof. However, these modifications or replacements do not cause the essence of the corresponding technical solutions to depart from the scope of the technical solutions of the embodiments of the present disclosure.

What is claimed is:

1. A bus parking allocation method considering operational preferences, the method comprising:
   obtaining a bus station dataset, a parking lot dataset, a bus information dataset, and a bus departure/return dataset;
   obtaining a distance dataset containing distances between bus stations and parking lots;
   building a parking allocation model considering operational preferences, wherein one group of buses are allocated to one group of parking lots, with each bus being allocated to at most one parking lot, the number of buses parked in each parking lot is less than or equal to a capacity of the parking lot, and an objective function of the parking allocation model is as follows:

$$\min \sum_{i \in B} \sum_{j \in P} c_i d_{ij} x_{ij}$$

$$x_{ij} = \begin{cases} 1, & \text{park } i^{th} \text{ bus at } j^{th} \text{ parking space} \\ 0, & \text{not park } i^{th} \text{ bus at } j^{th} \text{ parking space} \end{cases}$$

wherein $c_i$ represents costs per unit travel distance of an i-th bus, and $d_{ij}$ represents a travel distance between a parking lot and a bus station; and
   building bus preference lists and parking lot preference lists, and calculating the objective function while satisfying the bus preference lists and the parking lot preference lists, to minimize total parking costs of all buses, thereby obtaining parking allocation results considering operational preferences.

2. The bus parking allocation method considering operational preferences according to claim 1, wherein obtaining the bus station dataset, the parking lot dataset, the bus information dataset, and the bus departure/return dataset comprises:
   obtaining the bus station dataset, the parking lot dataset, the bus information dataset, and the bus departure/return dataset;
   wherein the bus station dataset comprises relevant information of all bus stations, with each bus station data record represented as $R_{stop}$=(sID,sName,sCoord), wherein sID represents a bus station ID, sName represents a bus station name, and sCoord represents bus station coordinates;

the parking lot dataset comprises relevant information of all bus parking lots, with each parking lot data record represented as $R_{park}$=(pID,pName,pCoord,capacity), wherein pID represents a parking lot ID, pName represents a parking lot name, pCoord represents parking lot coordinates, and capacity represents a parking lot capacity;

the bus information dataset comprises relevant information of all buses, with each bus data record represented as $R_{bus}$=(busID,type,len,unitCost), wherein busID represents a bus ID, type represents a bus type, len represents a bus length, and unitCost represents costs per kilometer for said bus type and bus length; and the bus departure/return dataset comprises relevant information about buses traveling from the parking lots to departure stations and returning from terminal stations to the parking lots, with each bus departure/return data record represented as follows:

$R_{BP}$=(busID,state,startSType,startSID,startTime,endSType,endSID,endTime)

wherein busID represents a bus ID, state represents a parking status, that is, departure or return, startTime represents a departure time, and endTime represents an arrival time; when state is departure, startSType indicates that a departure location is a parking lot, with startSID representing a parking lot ID, and endSType represents that an arrival location is a bus departure station, with endSID representing a bus station ID; when state is return, startSType indicates that a departure location is a terminal bus station, with startSID representing a bus station ID, and endSType indicates that an arrival location is a parking lot, with endSID representing a parking lot ID; and step 1.2: preprocessing data;

preprocessing the bus departure/return dataset by:

removing invalid empty data, comprising data where busID is empty, startTime is empty, or endTime is empty; next, sorting the buses by time to identify a first departure record and a last return record for each bus; and based on an departure parking lot ID of each bus, that is, startSID, calculating a current parking volume of each parking lot.

3. The bus parking allocation method considering operational preferences according to claim 2, wherein in step 2, for all the bus stations {$R_{stop}$} and all the parking lots ($R_{park}$), based on the bus station coordinates sCoord and the parking lot coordinates pCoord, travel distances between the bus stations and the parking lots are obtained using a map application programming interface (API) and stored in the distance dataset, with each distance data record represented as $R_{dist}$=(sID,pID,dist1,dist2), wherein dist1 represents a travel distance from bus station sID to parking lot pID, and dist2 represents a travel distance from parking lot pID to bus station sID.

4. The bus parking allocation method considering operational preferences according to claim 1, wherein the parking allocation model considering operational preferences is built, denoted as (B,P,$\succ_B$,$\succ_P$,$q_P$), wherein one group of buses B are allocated to one group of parking lots P, and each bus is allocated to at most one parking lot; $\succ_B$=($\succ_i$)$_{i\in B}$ represents bus preference relationships, and j$\succ_i$j' indicates that bus i prefers parking at parking lot j compared to parking lot j'; $\succ_P$=($\succ_j$)$_{j\in P}$ represents parking lot preference relationships, and i$\succ_j$i' indicates that parking lot j is more willing to accept bus i compared to bus i'; $q_P$ represents a parking space capacity of the parking lot, and the parking allocation model is defined as follows:

decision variables:

$$x_{ij} = \begin{cases} 1, & \text{park } i^{th} \text{ bus at } j^{th} \text{ parking space} \\ 0, & \text{not park } i^{th} \text{ bus at } j^{th} \text{ parking space} \end{cases}$$

objective function:

$$\min \sum_{i\in B}\sum_{j\in P} c_i d_{ij} x_{ij}$$

constraints:

$$\begin{cases} \sum_{j\in P} x_{ij} = 1, & \forall i \in B \text{ each bus is parked in only one parking lot} \\ \sum_{i\in B} x_{ij} \leq q, & \forall j \in P \text{ the number of buses parked in each} \\ & \text{parking lot is less than or equal to its capacity} \\ x_{ij} = 1 \text{ or } 0 \end{cases}$$

wherein in the objective function, $c_i$ represents costs for an i-th bus to travel per kilometer; $d_{ij}$ represents a travel distance between the parking lot and the bus station, that is, a sum of a travel distance from the parking lot to a departure station and a travel distance from a terminal station to the parking lot; and an optimization goal is to satisfy preferences of the buses and the parking lots while minimizing the total parking costs of all the buses.

5. The bus parking allocation method considering operational preferences according to claim 4, wherein step 4 comprises the following steps:

step 4.1: building the bus preference lists;

wherein a preference relationship of each bus regarding different parking lots, denoted as $\succ_B$, is defined based on a cost minimization criterion, and the bus preference list is calculated accordingly; for each bus, travel distances between the parking lots and the bus stations are calculated based on the distance dataset, then corresponding travel costs are calculated, and finally, based on the cost minimization criterion, a preference list of the bus regarding all the parking lots is built;

step 4.2: building the parking lot preference lists;

wherein a preference relationship of each parking lot regarding different buses, denoted as $\succ_P$, is defined considering bus management requirements of operational branches, and the parking lot preference list is calculated accordingly; managers define different parking lot preferences as needed; and step 4.3: obtaining preference-based parking allocation results using a Gale-Shapley algorithm;

wherein based on the bus preference lists and the parking lot preference lists, parking allocation is performed for the buses by using the Gale-Shapley algorithm; in each iteration, each unmatched bus applies, based on the bus preference list thereof, to park at a highest-ranked parking lot that the unmatched bus has not applied for before; then, the parking lot determines, based on preferences and capacity thereof, whether to accept the current application/replace an already accepted bus, or reject current matching; if a current number of matches for the parking lot does not exceed the capacity, matching continues; if the current number of matches exceeds the capacity, a lowest-priority match is removed from all matches for the parking lot; if all the buses find corresponding parking lots, the matching is successful, and the objective function is evaluated and solved; otherwise, a next iteration is performed.

6. The bus parking allocation method considering operational preferences according to claim 5, wherein in step 4.2, for each parking lot of a specified bus operational branch, IDs of buses under the jurisdiction of the parking lot are first obtained, and high priority is assigned to these buses; then, travel distances between the parking lot and bus stations are obtained, and corresponding travel costs are calculated; a secondary sorting is performed based on the cost minimization criterion, and a preference list of the parking lot regarding all the buses is built.

7. The bus parking allocation method considering operational preferences according to claim 5, wherein in step 4.2, high priority is assigned to buses originally parked in the parking lot and lowest priority is assigned to buses originally not parked in the parking lot; then, a secondary sorting is performed based on the cost minimization criterion, and the parking lot preference list is built.

8. The bus parking allocation method considering operational preferences according to claim 1, wherein the method further comprises step 5: designing multiple visualization views, comprising a regional parking allocation map, a parking lot traffic flow chart, a parking lot bus ratio chart, a distance distribution difference chart, and a regional parking allocation difference map;

the regional parking allocation map is used to display parking allocation results of an entire region; for each parking lot, the number of buses departing from the parking lot to different bus departure stations and returning from different bus terminal stations to the parking lot is counted first, and then visualized on the map; bus stations, parking lots, as well as incoming and outgoing traffic flows of the parking lots are identified;

the parking lot traffic flow chart is used to illustrate a parking traffic flow of buses associated with a specific parking lot; by selecting a parking lot of interest, a relevant traffic flow of buses parked in the selected parking lot is shown;

the parking lot bus ratio chart is used to illustrate operational branches to which buses parked in each parking lot belong; based on bus IDs in each parking lot, proportions of buses from different operational branches in each parking lot are calculated and then visualized on the map;

the distance distribution difference chart is used to compare differences in empty mileage optimization between an original parking allocation plan and a parking allocation plan considering preferences; and the regional parking allocation difference map is used to present geographical distribution differences in traffic between the original parking allocation plan and the parking allocation plan considering preferences; bus stations, parking lots, a parking traffic flow of the original parking allocation plan, a parking traffic flow considering preferences, and traffic flow sizes are identified; and by obtaining a distance value, parking allocation differences above the obtained distance value are displayed.

9. A bus parking allocation apparatus considering operational preferences, comprising a memory and one or more processors, wherein the memory stores executable code, and when executing the executable code, the one or more processors implement the bus parking allocation method considering operational preferences according to claim 1.

10. A bus parking allocation apparatus considering operational preferences, comprising a memory and one or more processors, wherein the memory stores executable code, and when executing the executable code, the one or more processors implement the bus parking allocation method considering operational preferences according to claim 2.

11. A bus parking allocation apparatus considering operational preferences, comprising a memory and one or more processors, wherein the memory stores executable code, and when executing the executable code, the one or more processors implement the bus parking allocation method considering operational preferences according to claim 3.

12. A bus parking allocation apparatus considering operational preferences, comprising a memory and one or more processors, wherein the memory stores executable code, and when executing the executable code, the one or more processors implement the bus parking allocation method considering operational preferences according to claim 4.

13. A bus parking allocation apparatus considering operational preferences, comprising a memory and one or more processors, wherein the memory stores executable code, and when executing the executable code, the one or more processors implement the bus parking allocation method considering operational preferences according to claim 5.

14. A bus parking allocation apparatus considering operational preferences, comprising a memory and one or more processors, wherein the memory stores executable code, and when executing the executable code, the one or more processors implement the bus parking allocation method considering operational preferences according to claim 6.

15. A bus parking allocation apparatus considering operational preferences, comprising a memory and one or more processors, wherein the memory stores executable code, and when executing the executable code, the one or more processors implement the bus parking allocation method considering operational preferences according to claim 7.

16. A bus parking allocation apparatus considering operational preferences, comprising a memory and one or more processors, wherein the memory stores executable code, and when executing the executable code, the one or more processors implement the bus parking allocation method considering operational preferences according to claim 8.

* * * * *